(12) United States Patent
McGilvray et al.

(10) Patent No.: US 7,998,572 B2
(45) Date of Patent: Aug. 16, 2011

(54) SELF-LUBRICATING COATINGS

(75) Inventors: Andrew Neil McGilvray, Stamford (GB); Atanu Adhvaryu, Peoria, IL (US); Lucy Victoria Davies, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 327 days.

(21) Appl. No.: 12/222,578

(22) Filed: Aug. 12, 2008

(65) Prior Publication Data

US 2010/0040864 A1 Feb. 18, 2010

(51) Int. Cl.
*B32B 5/16* (2006.01)
*F16C 33/12* (2006.01)
*C08L 79/08* (2006.01)
*C10M 125/04* (2006.01)

(52) U.S. Cl. ........ 428/323; 428/689; 428/699; 428/701; 428/702; 428/469; 508/103; 508/104; 508/105; 508/108; 508/123; 508/150; 508/154; 508/155; 508/161; 508/165; 508/166; 508/167

(58) Field of Classification Search .................. 428/323, 428/689, 699, 701, 702, 469; 508/103, 108, 508/104, 105, 123, 150, 154, 155, 161, 165, 508/166, 167
See application file for complete search history.

(56) References Cited

U.S. PATENT DOCUMENTS

| | | | |
|---|---|---|---|
| 5,437,802 A * | 8/1995 | Kurahashi et al. ............ 508/116 |
| 6,176,945 B1 | 1/2001 | Bancroft et al. |
| 6,228,471 B1 | 5/2001 | Neerinck et al. |
| 6,562,445 B2 | 5/2003 | Iwamura |
| 6,674,047 B1 | 1/2004 | Hughes et al. |
| 6,710,020 B2 | 3/2004 | Tenne et al. |
| 6,828,033 B1 | 12/2004 | Bancroft et al. |
| 7,067,022 B2 | 6/2006 | Branagan |
| 7,097,922 B2 | 8/2006 | Shen et al. |
| 7,255,083 B2 | 8/2007 | Hamada et al. |
| 7,273,655 B2 | 9/2007 | Miyake et al. |
| 7,306,778 B2 | 12/2007 | Chaffin |
| 2005/0005892 A1 | 1/2005 | Nishimura et al. |
| 2005/0064196 A1 | 3/2005 | Martin et al. |
| 2005/0082139 A1 | 4/2005 | Ishikawa et al. |
| 2006/0275595 A1 | 12/2006 | Thies et al. |
| 2007/0099014 A1 * | 5/2007 | McCullough et al. ........ 428/469 |
| 2007/0134432 A1 | 6/2007 | Gell et al. |
| 2008/0152491 A1 | 6/2008 | Davies |

FOREIGN PATENT DOCUMENTS

WO    WO 2007/082299    *   7/2007

OTHER PUBLICATIONS

Malshe et al., U.S. Appl. No. 12/007,555, filed Jan. 11, 2008.
Shafer et al., U.S. Appl. No. 11/858,679, filed Sep. 20, 2007.

* cited by examiner

*Primary Examiner* — Gwendolyn Blackwell
(74) *Attorney, Agent, or Firm* — Finnegan, Henderson, Farabow, Garrett & Dunner LLP

(57) ABSTRACT

A self-lubricating coating is disclosed. The coating includes a base material. The coating also includes a nanoparticle of a first material and a shell substantially surrounding the nanoparticle and including a second material different than the first material.

17 Claims, 3 Drawing Sheets

SELF-LUBRICATING COATINGS

TECHNICAL FIELD

The present disclosure is directed to self-lubricating coatings, and more particularly, self-lubricating coatings containing nanoparticles of a solid lubricant material.

BACKGROUND

Coatings may be applied to components of a machine to reduce wear and/or prevent corrosion. For example, where opposing components contact one another, and one moves relative to the other, a coating may be applied to the component surfaces to reduce wear between the components by controlling friction and/or providing increased resistance to wear. Nanoparticulate based materials, or ultra-fine grains and particles, can be added to the coatings to improve surface properties of the coating.

One application of a nanoparticle based coating is described in U.S. Pat. No. 7,097,922 B2 (the '922 patent) to Shen et al., issued on Aug. 29, 2006. The '922 patent describes a multi-layer super-hard nanocomposite coating for coating contact surfaces on substrates in a variety of industrial processes. A superficial layer of the super-hard nanocomposite coating includes a titanium-silicon-nitrogen (Ti—Si—N) film with microstructures having nanocrystalline grains of titanium nitride (TiN) in an amorphous matrix of silicon nitride (SiN). The nanocrystalline TiN may help to hinder the propagation of nanocracks and reinforce the bonding of grains and grain boundaries of the coating.

Although the nanoparticle based coating of the '922 patent may provide improved surface properties, it may have limitations. For example, the surface chemical reactivity of the particles of nanometer dimensions may be high. Therefore, the discrete nanocrystalline grains of the '922 patent may have a tendency to bind together (agglomerate). Additionally, because the TiN nanocrystalline grains are within an amorphous matrix of SiN, the nanocrystalline grains may fail to provide lubricating properties for the coating.

The coating of the present disclosure is directed towards improvements to the existing technology.

SUMMARY OF THE DISCLOSURE

One aspect of the present disclosure is directed to a machine component. The machine component may include a substrate and a coating on at least a portion of the substrate, the coating including a base material and nanoparticles of a lubricant material.

Another aspect of the present disclosure is directed to a machine component. The machine component may include a substrate and a coating on at least a portion of the substrate, the coating including a base material and a nanoparticle of a first material. The coating may also include a shell substantially surrounding the nanoparticle and including a second material different than the first material.

DETAILED DESCRIPTION

Figures 1, 2:
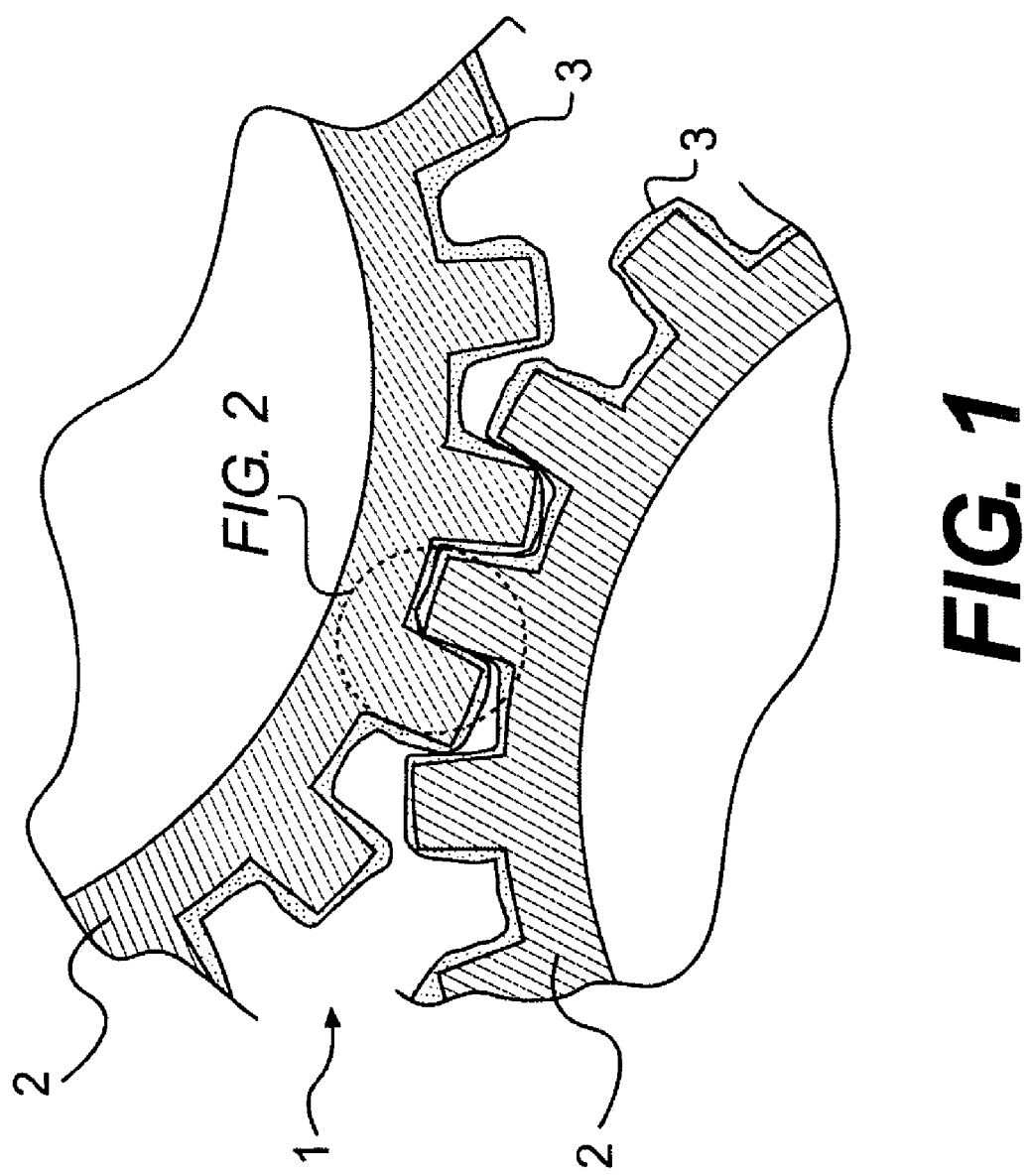
FIG. 1 illustrates exemplary surfaces under contact.
FIG. 2 illustrates an enlarged view of a region of the surfaces of FIG. 1.
Figure 2:
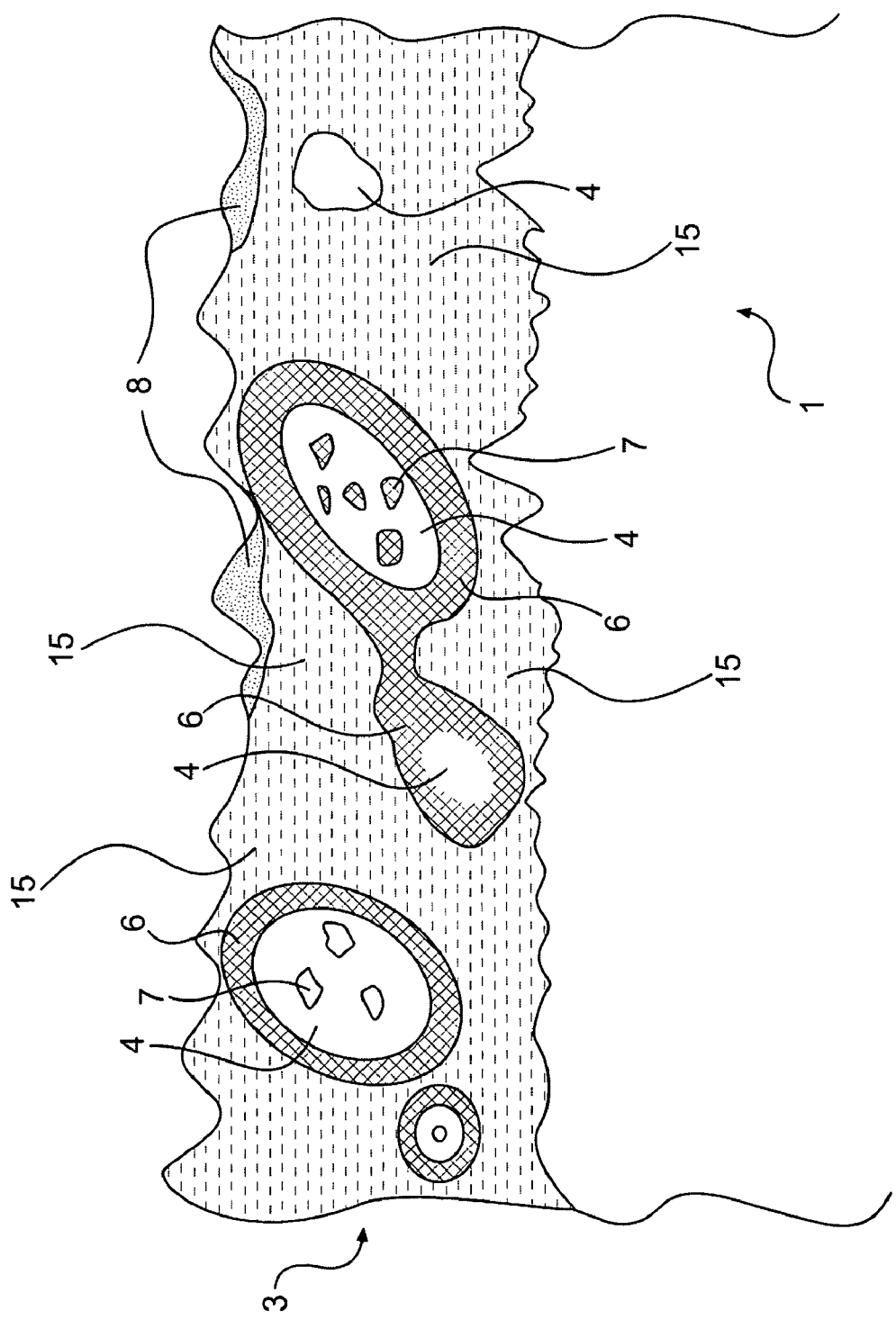

FIG. 1 illustrates exemplary surfaces 1 under frictional contact. Surfaces 1 may be part of machine components 2 that perform some sort of operation associated with an industry. Surfaces 1 may also include substrate materials for which a coating 3 is applied. Suitable substrate materials may include, for example, any suitable steel, such as tool steel, 51200 steel, and/or any other suitable material. Suitable materials can be selected based on desired physical properties (e.g., resistance to deformation), and/or ability to bond with overlying coatings and to withstand elevated temperatures, as may be present during coating deposition or device use. Non-limiting examples of surfaces 1 may include, contacting surfaces of a piston and a cylinder within an internal combustion engine, mating surfaces of a transmission gear assembly, etc. Coating 3 may be applied on at least a portion of a substrate of surfaces 1 to reduce friction and wear therebetween.

FIG. 2 illustrates an enlarged view of a region of the surfaces 1 of FIG. 1. Coating 3 may include nanoparticles 4 and base material 15. Base material 15 may include materials, such as chromium, nickel, cobalt, zinc, and combinations thereof. Additionally or alternatively, base material 15 may include various metal nitrides, metal carbides, and carbon-based materials. For example, in some embodiments, base material 15 may include at least one metal nitride selected from chromium nitride, zirconium nitride, molybdenum nitride, titanium-carbon-nitride, or zirconium-carbon-nitride. Alternatively, base material 15 may include a diamond-like carbon (DLC) material such as titanium-containing-DLC, tungsten-DLC, or chromium-DLC.

Nanoparticles 4 of coating 3 may include a solid lubricant material and/or other chemicals that enable nanoparticles 4 to be stable at nanoparticle dimensions. In this disclosure, the solid lubricant material is meant to include materials that are typically used as solid lubricants in the industry. For example, the lubricant material may include one or more of zinc dialkyl dithio phosphate (ZDDP), molybdenum disulfide ($MoS_2$), tungsten disulfide ($WS_2$), niobium diselininde ($NbSe_2$), gold (Au), silver (Ag), lead (Pb), tin (Sn), salts, and any other solid lubricant known in the industry.

Nanoparticles 4 of the solid lubricant material may have varying shape. In this application, nanoparticles 4 may have a common size substantially equal to 200 nanometers. Typically, the size of nanoparticle 4 refers to the diameter of a sphere that superscribes nanoparticle 4. In some embodiments, however, nanoparticles 4 may not exist as discrete particles in coating 3, but multiple nanoparticles 4 may be connected together. In such cases, the size of nanoparticle 4 refers to the size of the core of nanoparticle 4. In some embodiments, nanoparticles 4 may have a range of sizes less than or substantially equal to 200 nanometers. In some embodiments, a majority of nanoparticles 4 in coating 3 may have a size less than or substantially equal to 200 nanometers. In some other embodiments, the average size of nanoparticles 4 may be less than or substantially equal to 200 nanometers. In another embodiment, nanoparticles 4 may have a range of sizes below about 200 nanometers with a majority of particles having an average size below about 200 nanometers. While nanoparticles 4 may possess any shape, it is contemplated that in some applications, the shape of a substantial number of nanoparticles 4 may be tailored to a specific general shape, for example, a generally platelet like or a generally spherical shape.

Nanoparticle 4 may be substantially made of one of the solid lubricant materials noted above. Additionally or alternatively, nanoparticles 4 may be associated with two or more materials. For example, nanoparticles 4 may include cavities 7, such as intergranular spaces and/or pores, which may contain particles of another material. It is also contemplated that in some embodiments, nanoparticles 4 may be substantially free of cavities, or that any cavities 7 present may be unfilled.

A shell 6 may substantially surround nanoparticle 4 and may include a material different than the nanoparticle 4 material. Shell 6 may include a shell chemical configured to impart desirable properties to coating 3. The shell chemical may be phosphate based, amine based, sulphate based, or boron based. Non-limiting examples of the shell chemical may include zinc dialkyl dithio phosphate (ZDDP), sodium tripolyphosphate, potassium diphosphate, 2-ethylhexyl molybdenum dithiophosphate, and combinations thereof. In addition, shell chemical 6 may include any other suitable chemical agent capable of promoting friction-resistant and wear-resistant characteristics. In some embodiments, shell 6 may serve as a surface stabilization agent for nanoparticle 4. That is, the shell chemical may react with the surface of nanoparticle 4, and form shell 6 around nanoparticle 4. Shell 6 may reduce the surface energy of nanoparticle 4, thereby reducing the tendency of discrete nanoparticles 4 to agglomerate and grow in size. In cases where the shell chemical reacts with nanoparticle 4, shell 6 may be made as a reaction product of the chemical and the nanoparticle 4. In some other embodiments, the shell chemical may settle on the surface of nanoparticle 4 and harden. It is also contemplated that shell 6 may be a reaction product of the shell chemical and other reactants. Various methods may be employed to react the shell chemical with nanoparticle 4. For example, the shell chemical and nanoparticles 4 may undergo a chemical reaction or a chemo-mechanical process, wherein nanoparticles 4 are mechanically agitated with the shell chemical. The shell chemical may react with nanoparticles 4 though a thermal treatment where the components are heat cured. The shell chemical and the nanoparticles may undergo a radiation process where, for example, microwaves, ultraviolet waves, or any other form of radiation reacts the shell chemical to the surface of nanoparticles 4.

In addition, the shell chemical may seep into nanoparticle 4 and may fill cavities 7 and other spaces within nanoparticle 4. In some embodiments, the shell chemical that seeps into nanoparticle 4 may react with the nanoparticle 4 to form a reaction product. In these embodiments, a cross-section of the nanoparticle 4 may exhibit a layered appearance with the proportion of the shell chemical (or the reaction product of the shell chemical and nanoparticle 4) increasing towards the exterior of nanoparticle 4.

It is also contemplated that coating 3 may include a mixture of different types of nanoparticles 4. That is, the coating 3 may include nanoparticles 4 of a solid lubricant material, nanoparticles 4 of substantially one solid lubricant material substantially surrounded by shell 6, and/or nanoparticles 4 of multiple solid lubricant materials surrounded by shell 6. For example, some nanoparticles 4 may be of $MoS_2$ substantially surrounded by shell 6, while some nanoparticles 4 may be of $WS_2$ substantially surrounded by shell 6. In addition nanoparticles 4 of both $MoS_2$ and $NbSe_2$ may be surrounded by shell 6.

The size of nanoparticles 4 may change over time. For example, the size of nanoparticles 4 may decrease over time. This decrease in size may be the result of material transfer of nanoparticle 4 to contacting surfaces 1 through delamination processes at the contact zone of contact surfaces 1. As motion and pressure is applied to coating 3, shells 6 may delaminate, and nanoparticles 4 may transfer from being nanoparticles and form a solid lubricating layer 8 on the surface of coating 3 or on surface 1 of component 2 in contact with coating 3. Furthermore, shells 6 may undergo a chemical reaction as motion and pressure is applied to coating 3, and form a chemical compound different from shell 6 and nanoparticles 4 that may partially or substantially cover coating 3. Solid lubricating layer 8 may accumulate over parts of surface 1 and coating 3 and may increase in coverage over time. In some embodiments, the accumulated solid lubricating layer 8 may cover substantial areas of surface 1 or coating 3. Also, the composition of nanoparticle 4 may change with time. The shell chemical that soaked into nanoparticle 4 may leak out, thereby, changing the composition of nanoparticle 4 over time.

Figure 3:
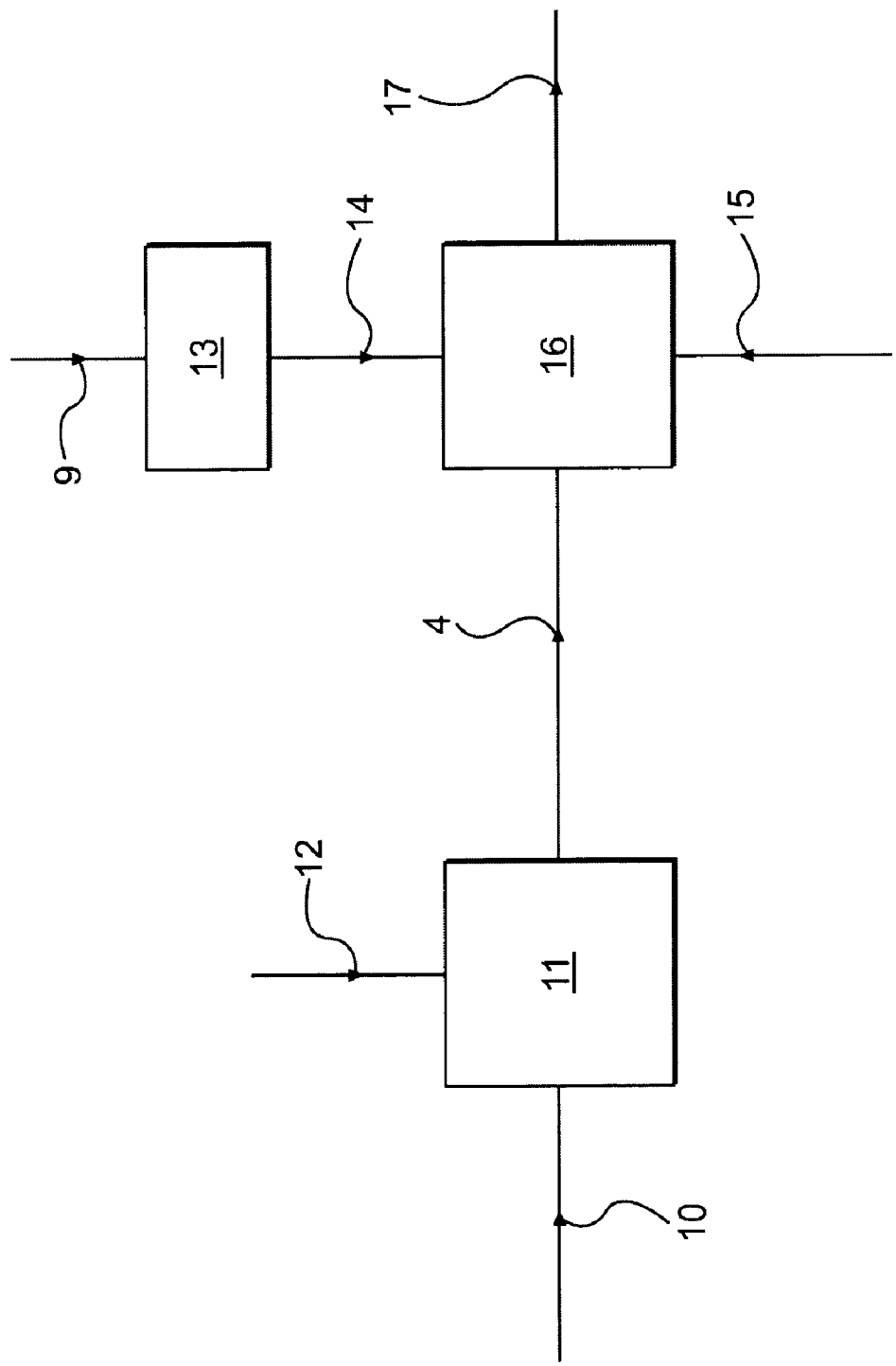
FIG. 3 illustrates an exemplary process of manufacture of the self-lubricating coating of FIG. 2.

FIG. 3 illustrates an exemplary process of applying coating 3 to a machine part 9. Machine part 9 may include, for example, machine components, which may be subject to frictional contact and loads. Machine part 9 may also be a used part, for example, a piston that has already undergone sliding contact with a cylinder. Solid lubricant material 10 may be loaded into a chemical-mechanical grinding machine 11. Chemical-mechanical grinding machine 11 may be any means capable of grinding (reducing the physical size of) solid lubricant material 10 to nanoparticle form and enabling a chemical reaction between a chemical agent and nanoparticles 4 of solid lubricant material 10. Chemical-mechanical grinding machine 11 may include a mechanical ball mill, rod mill, SAG mill, autogenous mill, pebble mill, high pressure grinding rolls, buhrstone mill, or any other grinding means capable of grinding solid lubricant material into nanoparticle form. A shell chemical 12 may also be fed into chemical-mechanical grinding machine 11. Shell chemical 12 may be a solid, liquid or a gelatinous type material. It is also contemplated that, in some application, shell chemical 12 may be a gaseous material. In other embodiments, shell chemical 12 may be reacted with nanoparticles 4 outside of the milling environment. In some embodiments, commercially available solid lubricant material 10 in the form of a coarse powder may partially fill a tumbler of chemical-mechanical grinding machine 11, along with shell chemical 12 and a grinding medium. The grinding medium may include, for example, stainless steel or ceramic balls. The tumbler may then be rotated or agitated, causing the grinding media to grind solid lubricant material 10 into nanoparticle form. Shell chemical 12 may further react with the nanoparticles 4 of solid lubricant material 10 to form shells 6 around nanoparticles 4. In some embodiments, the solid lubricant powder and shell chemical 12 may also be subjected to one or more heating steps during grinding. It is also contemplated that the grinding and/or the reaction step may be conducted under a selected ambient condition, for example, under an inert gas, or at an elevated temperature. Additionally or alternatively, nanoparticles 4 of solid lubricant material 10 may be removed from chemical-mechanical grinding machine 11 without being reacted with shell chemical 12.

In another embodiment, chemical-mechanical grinding machine 11 may include multiple machines, and the conversion of solid lubricant material 10 to nanoparticles 4 may occur in multiple stages. For example, a first chemical-mechanical grinding machine may grind solid lubricant material 10 to a powder of a predetermined size greater than about 200 nanometers under a selected ambient condition. This powder may then be ground in the same or a second chemical-mechanical grinding machine/operation further. The second chemical-mechanical grinding machine/operation may be similar to the first chemical-mechanical grinding machine/operation, or it may be different. For instance, the first chemical-mechanical grinding machine may be a dry grinding machine and the second chemical-mechanical grinding machine may be a wet grinding machine that grinds the powder output from the first chemical-mechanical grinding machine in the presence of a liquid shell chemical 12. Grinding the powder in the presence of the liquid shell chemical 12 may produce nanoparticles 4 substantially surrounded by shell 6. Measurement and filtration processes may also be incorporated between the multiple grinding operations. In addition, a vibratory or agitation process through, for example, ultrasound, may be incorporated after shell chemical 12 and nanoparticles 4 have been reacted to separate any agglomerated particles.

Any combination of grinding processes and chemical processes may be used to manufacture nanoparticles 4. For instance, in one embodiment, two solid lubricant materials are ground separately (in the same or different chemical-mechanical grinding machines) to form two groups of solid lubricant powders. These powders may be mixed with shell chemical 12 (the same or different shell chemical) separately and subjected to another grinding process to form two groups of nanoparticles 4 substantially surrounded by shells 6. These groups of nanoparticles 4 may then be mixed together. In another embodiment, the two groups of solid lubricant powder, that are formed by grinding the solid lubricant materials separately, are first mixed together and then treated with a shell chemical 12. The mixed powders are further ground in the presence of the same or a different shell chemical to form nanoparticles 4.

Prior to applying coating 3 to machine part 9, at least a portion of a surface of machine part 9 may be prepared by cleaning and/or treating process 13. For example, cleaning may remove contaminants from the surface and may be accomplished through a number of conventional methods, such as degreasing, grit blasting, etching, chemically-assisted vibratory techniques, and the like. Furthermore, surface finishing may be performed to enhance coating adhesion and/or to affect coating structure. For example, in some embodiments, the desired surface may be produced by a grinding or polishing process, through ultrasonic cleaning with an alkaline solution, and/or ion-etching of the surface. In addition, in some embodiments, selected surfaces may be heat treated prior to application of coating 3 to prevent further changes in surface dimensions during operation in a machine. Once treated, machine part 9 may be a treated machine part 14.

Treated machine part 14, nanoparticles 4, and base material 15, such as chromium, nickel, cobalt, and zinc as described above, may undergo a coating process 16 to apply coating 3 on the surface of treated machine part 14. Coating 3 may be applied to the surface of machine part 9 by a number of suitable processes. For example, an electrodeposition process may be employed. In such a process, the surface of treated machine part 14 to be coated is immersed in a low temperature bath of an electrolyte solution, the solution including a mixture of dissolved base material 15 and nanoparticles 4. A rectifier may supply a direct current to the surface of the treated machine part 14 causing the dissolved base material 15 and nanoparticles 4 in the electrolyte solution to be drawn to and deposited on the surface. It is contemplated that the electrolyte bath may include an agitator or a mixer to promote uniform distribution and deposition of base material 15 and nanoparticles 4 on the surface of treated machine part 14. The agitator or the mixer may include, for example, a shaking mechanism for shaking the bath or a stirrer for mixing the electrolyte solution, base material 15, and nanoparticles 4. Electrolyte solution may be replenished with base material 15 and nanoparticles 4 to increase the thickness of coating 3. In addition, the percentage of nanoparticles 4 to base material 15 may vary depending on the thickness of coating 3, the surface area of the coated surface, and desired degree of lubrication provided by coating 3.

Alternatively, coating 3 may be applied to the surface of treated machine part 14 by an electroless deposition process. In such a process, instead of utilizing a direct current, a reducing agent may be included in the electrolyte solution having a mixture of base material 15 and nanoparticles 4 to create a chemical reaction and draw and coat the surface of treated machine part 14 with coating 3. Once coating process 16 is complete, treated machine part 14 becomes a coated machine part 17.

It is also contemplated that coating 3 may be applied in a dip-coating process. In such a process, the surface of treated machine part 14 may be dipped in a solution including a mixture of dissolved base material 15 and nanoparticles 4. The surface of may then by heat cured to harden and form coating 3 and coated machine part 17. The surface of coated machine part 17 may then be polished to smoothen the surface of coating 3.

INDUSTRIAL APPLICABILITY

The disclosed self-lubricating coating 3 of the present disclosure may be used to reduce the friction and/or wear between any moving parts. Coating 3 may contain nanoparticles 4 which may enhance the lubricating properties of coating 3. Nanoparticles 4 may have a composite structure and may be of a solid lubricant material and substantially surrounded by an outer shell 6 made of a shell chemical that imparts desirable properties to coating 3. The shell chemical may also serve as a surface stabilization agent that reacts with the surface of nanoparticle 4 to form a shell 6 that reduces the tendency of the nanoparticles 4 to agglomerate and grow in size.

Under conditions of friction and pressure between surfaces 1, nanoparticles 4 may undergo structural deformation, resulting in the formation of a solid lubricant layer 8 on surfaces 1 and on coating 3 that may be capable of accommodating sliding/shear motion. The formation of a lubricating film on surfaces 1 and coating 3 may also lead to reduced friction and wear between components in the boundary and enhanced pressure lubrication regime.

The process of manufacturing the self-lubricating coating 3 may include reducing the size of commercially available solid lubricant particles to nanometer dimensions by mechanical means, and surface stabilization by reacting these particles with a shell chemical. The resulting nanoparticles 4 may possess a composite structure with a solid lubricant core surrounded by shell 6 of the shell chemical. These nanoparticles 4 may be used as a solid lubricant powder, or may be dispersed in a conventional coating to create the nanoparticulate based coating 3.

To illustrate the process of manufacture of self-lubricating coating 3, an example case will be described. Commercially available $MoS_2$ powder, between about 700 nanometers and about 1 micron (1000 nanometers) in size, may be subjected to mechanical milling in a SPEX CertiPrep model 8000D ball milling machine. Milling may be conducted in the presence of a liquid shell chemical media of zinc dialkyl dithio phosphate (ZDDP) using a grinding media of hardened stainless steel grinding balls. The resulting slurry of nanoparticles 4 in the shell chemical media may contain particles ranging in sizes between about 10 nanometers and 200 nanometers. Some nanoparticles 4 contained in the slurry may be made of $MoS_2$ and surrounded by a phosphate based shell. Some $MoS_2$ nanoparticles 4 may also show penetration of the shell chemical media into cavities 7 of nanoparticles 4. This slurry containing nanoparticles 4 may be used as a lubricant paste or may be dispersed into a coating 3 during an electrodeposition or electroless deposition process as described above.

In nanoparticles 4 formed using this technique, the surface energy of the nanoparticles may dissipate by reaction with the shell chemical. The resulting composite structure of nanoparticles 4 encapsulated by shell 6 may reduce the tendency of nanoparticles 4 to agglomerate and grow in size. The composite structure of nanoparticles 4, therefore, may help maintain the nanometer dimensions of nanoparticles 4, while retaining the novel properties arising out of the small dimensions of nanoparticles 4. For example, distribution and uniformity of composite structures on the surface of and within coating 3 may be improved.

It will be apparent to those skilled in the art that various modifications and variations can be made to the coating of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A machine component, comprising:
    a substrate; and
    a coating on at least a portion of the substrate, the coating including:
        a base material;
        nanoparticles of a lubricant material; and
        a non-metallic shell surrounding the nanoparticles of the lubricant material, the shell being composed of a material different than the lubricant material.

2. The machine component of claim 1, wherein a common size of the nanoparticles is substantially equal to 200 nanometers.

3. The machine component of claim 1, wherein the lubricant material is selected from a group consisting of zinc dialkyl dithio phosphate, molybdenum disulfide, tungsten disulfide, niobium diselininde, gold, silver, lead, and tin, or combinations thereof.

4. The machine component of claim 1, wherein the nanoparticles are associated with a compound selected from a group consisting of a phosphate based compound, an amine based compound, a sulphate based compound, and a boron based compound, or combinations thereof.

5. The machine component of claim 1, wherein the nanoparticles are associated with a compound selected from a group consisting of zinc dialkyl dithio phosphate, sodium tripolyphosphate, potassium diphosphate, and 2-ethylhexyl molybdenum dithiophosphate, or combinations thereof.

6. The machine component of claim 1, wherein the base material is selected from a group consisting of chromium, nickel, cobalt, zinc, metal nitrides, metal carbides, and carbon-based materials, or combinations thereof.

7. A machine component, comprising:
    a substrate; and
    a coating on at least a portion of the substrate, the coating including:
        a base material;
        a first nanoparticle of a first material;
        a second nanoparticle of a second material different than the first material;
        a first shell substantially surrounding the first nanoparticle; and
        a second shell substantially surrounding the second nanoparticle, wherein the first and second shells are composed of a third material different than the first and second materials.

8. The machine component of claim 7, wherein a size of the first and second nanoparticles is less than or substantially equal to 200 nanometers.

9. The machine component of claim 7, wherein the third material includes a shell chemical.

10. The machine component of claim 9, wherein the shell chemical includes a compound selected from a group consisting of a phosphate based compound, an amine based compound, a sulphate based compound, and a boron based compound, or combinations thereof.

11. The machine component of claim 9, wherein the shell chemical includes a compound selected from a group consisting of zinc dialkyl dithio phosphate, sodium tripolyphosphate, potassium diphosphate, and 2-ethylhexyl molybdenum dithiophosphate, or combinations thereof.

12. The machine component of claim 7, wherein the first material and the second material include a lubricant material.

13. The machine component of claim 12, the lubricant material includes a material selected from a group consisting of zinc dialkyl dithio phosphate, molybdenum disulfide, tungsten disulfide, niobium diselininde, gold, silver, lead, and tin, or combinations thereof.

14. The machine component of claim 7, wherein the coating is configured to form a lubricating layer when pressure is applied to the coating.

15. A machine component, comprising:
    a substrate; and
    a coating on at least a portion of the substrate, the coating including:
        a base material;
        a first nanoparticle of a first material;
        a second nanoparticle of a second material different than the first material;
        a first non-metallic shell surrounding the first nanoparticle; and
        a second non-metallic shell surrounding the second nanoparticle, wherein the first and second shells are composed of a third material different than the first and second materials.

16. The machine component of claim 15, wherein the first material and the second material include a lubricant material.

17. The machine component of claim 16, wherein the lubricant material includes a material selected from a group consisting of zinc dialkyl dithio phosphate, molybdenum disulfide, tungsten disulfide, niobium diselininde, gold, silver, lead, and tin, or combinations thereof.

* * * * *